Dec. 10, 1968    J. M. JAMES, JR    3,415,589
METHOD FOR IMPROVING VISIBILITY OF A MOVING
OBJECT BY CIRCULAR POLARIZED LIGHT
Filed April 15, 1965
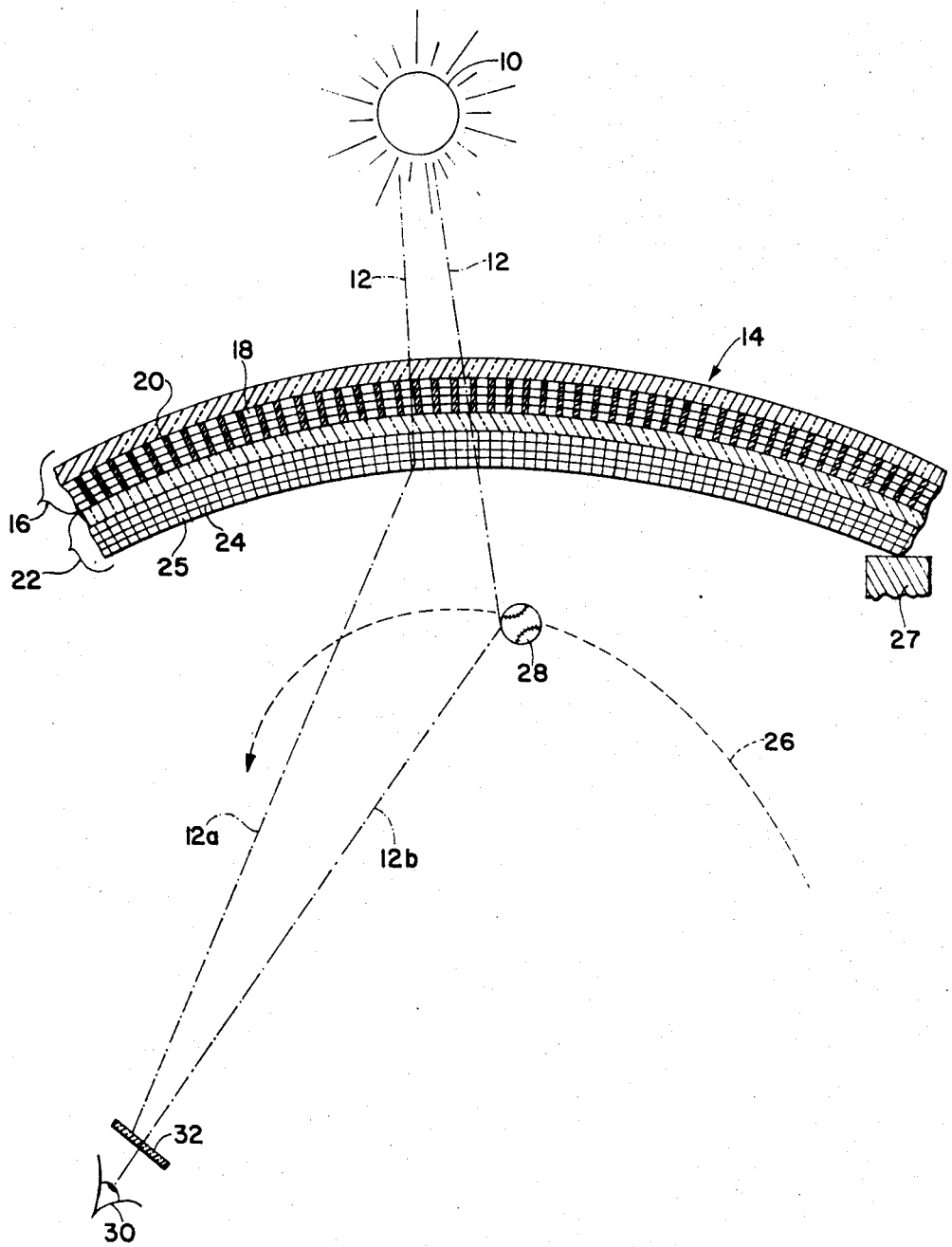
INVENTOR.
Justin M. James, Jr.
BY Brown and Mikulka
ATTORNEYS

United States Patent Office 3,415,589
Patented Dec. 10, 1968

3,415,589
METHOD FOR IMPROVING VISIBILITY OF A MOVING OBJECT BY CIRCULAR POLARIZED LIGHT
Justin M. James, Jr., Winchester, Mass., assignor to Polaroid Corporation, Cambridge, Mass., a corporation of Delaware
Filed Apr. 15, 1965, Ser. No. 448,428
1 Claim. (Cl. 350—156)

ABSTRACT OF THE DISCLOSURE

The present disclosure relates to a method of improving the visibility of a moving object such as a baseball, when viewed against a background of alternately light and dark areas existing in the roof of a domed sports stadium. To achieve this result, a controlled use of circularly polarized light is utilized to extinguish the background light when viewing the moving object.

---

The invention has for its principal purpose improving the visibility, in a domed sports stadium having a patterned roof or dome of light-transmitting and opaque sections, of an object, such as a baseball, which has been hit in the air by a "batter" of one team and which a "fielder" of an opposing team is endeavoring to catch. It is to be assumed that the trajectory of the batted ball is such that the fielder views the ball against the background of the patterned dome, light rays from a light source such as the sun being incident upon the side of the latter remote from the fielder. The ball, in crossing alternately light-transmitting and opaque sections becomes extremely difficult to perceive, apparently due to the inability of the human eye to adjust or accommodate to the different areas with a rapidity necessary in following the flight of the ball. Thus, assuming, for example, that sunlight is incident upon the remote surface of the dome, an undue task is placed upon the eyes and the mechanism of perception is to a large degree unable to integrate between the alternately light and dark areas such that momentary "blindness" occurs. The problem is accentuated when the light-transmitting areas or sections are of a translucent rather than a transparent character in that the translucent areas tend to optically scatter the light and produce glare.

In view of the foregoing considerations, objects of the invention are to provide a method of substantially improving the visibility of an object moving in a trajectory across a background of intermittently or alternately light-transmitting and opaque sections of a continuous structure having a light source at the remote side thereof with respect to a viewer; to provide a method of the character described wherein light-polarizing means, and more particularly, circularly light-polarizing means, are employed to effect said improvement in visibility; and to provide a product wherein a light-polarizing material is structurally combined with a material composed of alternately light-transmitting and opaque areas for the subject purpose.

For a fuller understanding of the nature and objects of the invention, reference should be had to the accompanying drawing wherein a diagrammatic perspective view of means illustrating the invention is shown.

Referring to the drawing, a light source 10, such as the sun produces light rays 12 which are incident upon the curved roof or dome 14 of an enclosing structure such as a sports stadium. The dome comprises a first component 16 composed of alternately light-transmitting sections 18 and opaque sections 20, and a second component 22 composed of sections 24 of circularly light-polarizing material having a given rotational direction superimposed and optically aligned with the sections 18. Non-polarizing sections 25 of any suitable material may be interposed between the sections 24. Alternatively, the sections 24 can be larger than sections 18 or even a continuous sheet. The components 16 and 22 may be in the form of a unitary lamination or in the form of individual members, preferably contiguous and essentially so if composed of similarly dimensioned sections. It will be understood that supporting means such as structural steel braces, girders or the like (not shown) are provided extending, for example, vertically along said opaque areas and, as may be required, circularly around the dome. The supporting members rest upon the walls 27 of the building at their outer extremities.

The trajectory 26 of a batted baseball 28 is indicated. The eye of the baseball player designated the "fielder" is shown at 30. A pair of glasses or a visor comprising a circularly light-polarizing material 32 having a rotational direction opposite to that of said first-named circularly light-polarizing material of sections 24 is worn by the fielder. Unpolarized rays 12 are incident upon the dome 14. The rays which pass through the light-transmitting sections of components 16 and 22 are circularly polarized in said first-named given rotational direction. The rays 12a which pass directly to the circularly polarizing material 32 of the viewing means having an opposite rotational direction are blocked by the latter. The rays 12b reflected from the baseball 28 are substantially depolarized by the latter and thus pass through the material 32 to the eye of the viewer. Accordingly, the unwanted glare-producing rays 12a are substantially eliminated and the wanted rays reflected by the baseball are rendered visible, this being the desired condition for maximum perception of the baseball.

Materials of the type contemplated in the structure of the dome 14 include, for the light-transmitting sections 18 of component 16, an acrylic such as that having the trade name "Lucite" manufactured by E. I. du Pont de Nemours and Company, Wilmington, Del., and for the circularly light-polarizing material of the component 22, a circularly light-polarizing sheet material comprising a linear polarizer and a ¼λ material, with the latter facing the viewing analyzer 32. Such a light-polarizing material is manufactured by Polaroid Corporation, Cambridge, Mass. However, the latter material may be of a type having a somewhat higher or lower transmission than that commercially marketed. The opaque sections 20 may appropriately be of a suitable metal such as structural steel.

It will be understood that the present invention is applicable to other uses than that specified, e.g., other sports such as football, tennis, basketball and the like. It will also be understood that the respective circularly polarizing elements have their components properly oriented in a manner known to the art for extinction of incident light rays, e.g., an orthogonal relation of axes of the linear polarizing components thereof; with principal axes of ¼λ plates at 45° relative thereto, etc.

Since certain changes may be made in the above method and product without departing from the scope of the invention herein involved, it is intended that all matter contained in the above description or shown in the accompanying drawing shall be interpreted as illustrative and not in a limiting sense.

What is claimed is:

1. A method of improving the perceptibility of an object having a light-depolarizing surface in motion in an enclosed stadium or the like having a light-admitting roof comprising alternate light-transmitting and substantially opaque sections, the improvement occurring when said object is viewed against said roof as a background with at least one source of light located at the remote or outer side of said roof, the object being caused to pass rapidly across successively dark- and light-appearing sections so as to reduce its perceptibility due to inability of the eyes of a viewer, in attempting to variably focus upon said object, to adjust to the differences in brightness of said background sections, said method comprising the steps of converting unpolarized light from said source and transmitted by said light-transmitting sections to light circularly polarized in a given rotational direction by superimposing at least one circularly light-polarizing element having said given rotational direction adjacent to and in optical alignment with said sections, and blocking said circularly polarized light by interposing a circularly light-polarizing analyzing element having an opposite rotational direction before the eyes of a viewer at a location spaced from said roof, whereby said light-transmitting and opaque sections are rendered effectively continuously opaque and of a generally uniformly dark appearance, the circularly polarized light incident upon and reflected from said object to said analyzing element being depolarized by said object and passing through said analyzing element to the eyes of said viewer so that said object is rendered brightly visible against an overall darkened background and the necessity of an attempted visual adjustment to the aforesaid light-transmitting and opaque sections is eliminated.

References Cited

UNITED STATES PATENTS

| | | |
|---|---|---|
| 2,301,126 | 11/1942 | Kriebel. |
| 3,069,974 | 12/1962 | Marks et al. |
| 3,075,429 | 1/1963 | Deddo. |

OTHER REFERENCES

Shurcliff: "Polarized Light" (Harvard University Press, Cambridge, Mass.), 1962, p. 107.

DAVID SCHONBERG, *Primary Examiner.*

P. R. MILLER, *Assistant Examiner.*

U.S. Cl. X.R.

350—152, 157; 240—9.5